US008826633B2

(12) United States Patent
Buse et al.

(10) Patent No.: US 8,826,633 B2
(45) Date of Patent: Sep. 9, 2014

(54) PACKS, IN PARTICULAR FOR CIGARETTES, AND METHOD AND APPARATUS FOR PRODUCING SAID PACKS

(75) Inventors: Henry Buse, Visselhövede (DE); Reinhard Lohmann, Scheeβel (DE)

(73) Assignee: Focke & Co. (GmbH & Co. KG), Verden (DE)

( * ) Notice: Subject to any disclaimer, the term of this patent is extended or adjusted under 35 U.S.C. 154(b) by 27 days.

(21) Appl. No.: 13/513,347

(22) PCT Filed: Oct. 20, 2010

(86) PCT No.: PCT/EP2010/006412
§ 371 (c)(1),
(2), (4) Date: Jun. 6, 2012

(87) PCT Pub. No.: WO2011/069575
PCT Pub. Date: Jun. 16, 2011

(65) Prior Publication Data
US 2012/0241339 A1      Sep. 27, 2012

(30) Foreign Application Priority Data

Dec. 9, 2009  (DE) .......................... 10 2009 057 373
Dec. 23, 2009 (DE) .......................... 10 2009 060 134

(51) Int. Cl.
*B65B 19/02*           (2006.01)
(52) U.S. Cl.
USPC ................ 53/444; 53/477; 53/491; 53/375.9; 53/376.2; 53/376.3; 53/376.6; 53/377.2
(58) Field of Classification Search
USPC ............. 53/443, 444, 147, 148, 375.8, 375.9, 53/376.2, 376.3, 376.4, 376.6, 376.7, 53/377.2, 377.7, 477, 484, 491
See application file for complete search history.

(56) References Cited

U.S. PATENT DOCUMENTS 2,322,654 A * 6/1943 Moore .......................... 383/210
4,294,642 A * 10/1981 Focke et al. ................... 156/250
(Continued)

FOREIGN PATENT DOCUMENTS

CN      1596211 A    3/2005
DE      2833389 A1   2/1980
(Continued)

OTHER PUBLICATIONS

European Patent Report on related application EP 10 00 1032 (Apr. 5, 2013).
(Continued)

*Primary Examiner* — Christopher Harmon
(74) *Attorney, Agent, or Firm* — Laurence P. Colton; Smith Risley Tempel Santos LLC

(57) ABSTRACT

A pack, and a method and apparatus for producing the pack, comprising an outer pack and an inner pack as a sealed block with an inner blank which encloses the pack contents, the inner pack having, in the region of an inner end wall, an opening aid which can be used a number of times and, in the region of side walls of the inner pack, folding flaps which are connected to one another by thermal sealing. Folding flaps in the region of an inner rear wall of the inner blank are configured as a fin fold and are connected to one another by thermal sealing outside the region of the cigarette group to form a fin seam, the fin seam being arranged at a spacing from regions of folding flaps which cover one another multiple times, in the region of the inner side walls.

12 Claims, 12 Drawing Sheets

(56) References Cited

U.S. PATENT DOCUMENTS

| | | | |
|---|---|---|---|
| 4,617,780 A | | 10/1986 | Focke |
| 4,648,236 A | | 3/1987 | Knecht |
| 4,718,216 A | | 1/1988 | Focke |
| 4,916,884 A | * | 4/1990 | Focke et al. .................. 53/462 |
| 5,154,035 A | | 10/1992 | Cavazza |
| 5,477,661 A | * | 12/1995 | Draghetti et al. ............. 53/466 |
| 5,613,344 A | * | 3/1997 | Osti et al. .................... 53/234 |
| 5,701,725 A | * | 12/1997 | Neri et al. .................... 53/466 |
| 5,732,533 A | | 3/1998 | Focke |
| 7,200,978 B1 | | 4/2007 | Focke |
| 8,276,750 B2 | * | 10/2012 | Biondi et al. ................ 206/259 |
| 2009/0190866 A1 | | 7/2009 | Hughes |
| 2009/0288371 A1 | * | 11/2009 | Squarzoni et al. ............ 53/456 |
| 2010/0132312 A1 | * | 6/2010 | Biondi et al. ................. 53/466 |
| 2012/0174534 A1 | * | 7/2012 | Cavazza et al. ............... 53/463 |

FOREIGN PATENT DOCUMENTS

| | | | |
|---|---|---|---|
| DE | 2847161 A1 | 5/1980 | |
| DE | 19521476 A1 | 12/1996 | |
| DE | 10000697 A1 | 7/2001 | |
| DE | 10115935 A1 | 10/2002 | |
| DE | 69811725 T2 | 9/2003 | |
| DE | 102007004029 | 7/2008 | |
| DE | 102008033937 A1 | 1/2009 | |
| EP | 0031515 B1 | 7/1981 | |
| EP | 0496261 B1 | 7/1992 | |
| EP | 0667232 B1 | 8/1995 | |
| EP | 1055603 A1 | 11/2000 | |
| EP | 2008935 A1 | 12/2008 | |
| EP | 2090511 A1 | 8/2009 | |
| EP | 2193995 A1 | 6/2010 | |
| EP | 2435314 A1 | 4/2012 | |
| GB | 587956 A | 5/1947 | |
| GB | 2451180 A | 1/2009 | |
| IT | 2008BO00080 | 2/2008 | |
| IT | 2008BO00094 | 2/2008 | |
| IT | 2008BO00327 | 5/2008 | |
| IT | BO20080080 A1 | 8/2009 | |
| JP | 2002284109 | 10/2002 | |
| WO | 98/49072 A1 | 11/1998 | |
| WO | 9849072 A1 | 11/1998 | |
| WO | 2008062159 A1 | 5/2008 | |
| WO | 2009098297 A1 | 5/2009 | |
| WO | 2009/098297 A1 | 8/2009 | |
| WO | 2009098297 A1 | 8/2009 | |
| WO | 2009130227 A1 | 10/2009 | |
| WO | 2010136869 A1 | 12/2010 | |

OTHER PUBLICATIONS

Studio Torta, Letter to European Patent Office, Jan. 15, 2013, Italy.
State Intellectual Property Office of the People'S Republic of China, Notification of the First Office Action (for related China Patent Application No. 201080056193.2)( (Dec. 3, 2013).

* cited by examiner

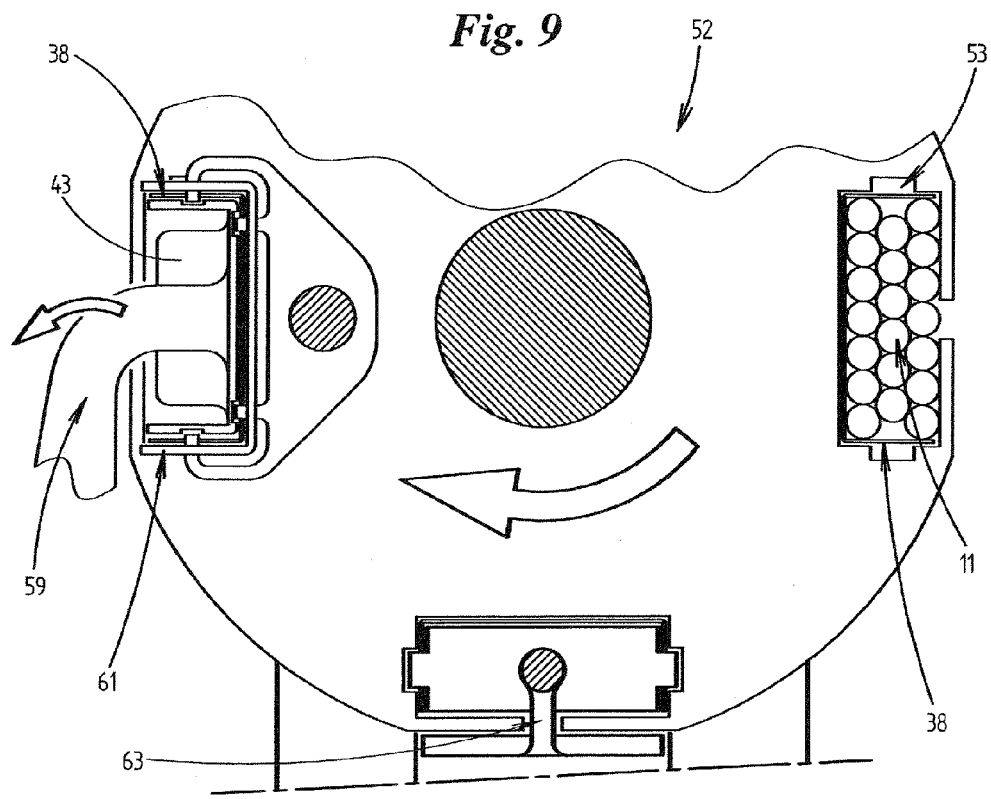
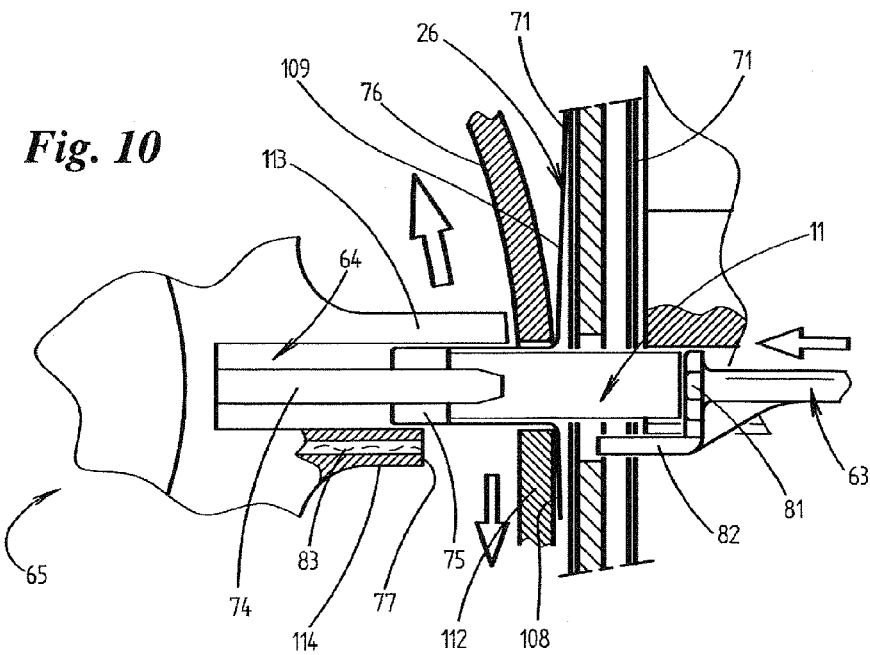

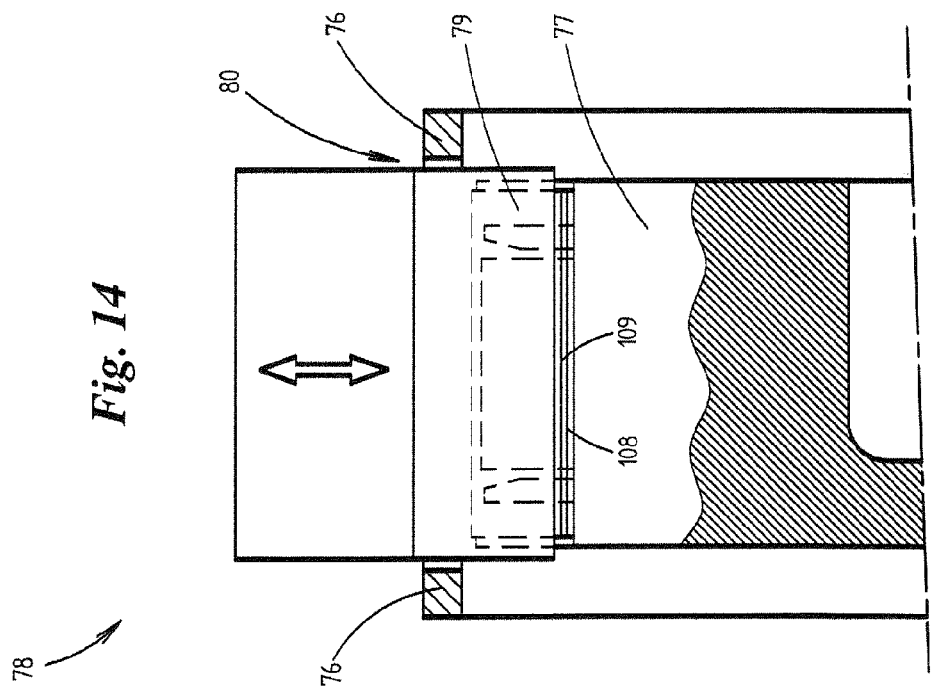
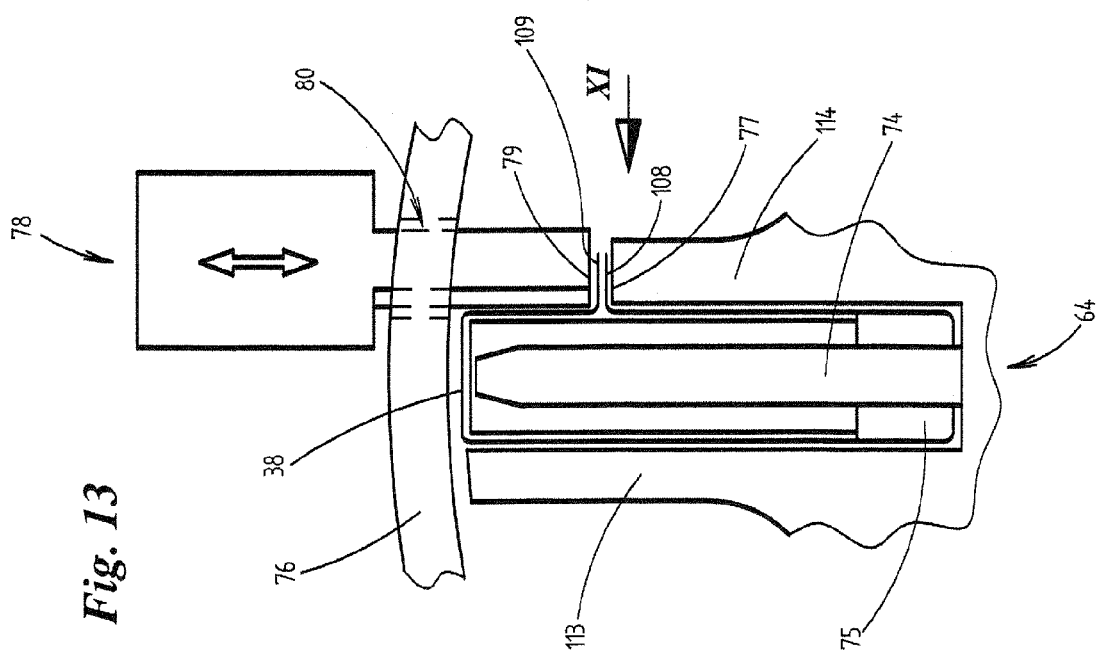

PACKS, IN PARTICULAR FOR CIGARETTES, AND METHOD AND APPARATUS FOR PRODUCING SAID PACKS

BACKGROUND OF THE INVENTION

1. Technical Field

The invention relates to a pack for piece-form articles, in particular for cigarettes, comprising an outer pack, preferably configured as a hinge-lid box, and an inner pack as a sealed block with an inner blank which encloses the pack contents, in particular a cigarette group, and is made of preferably aroma-tight and moisture-tight, thermally sealable sheet material, the inner pack having, in the region of an inner end wall, an opening aid which can be used a number of times and, in the region of side walls of the inner pack, folding flaps which are connected to one another by thermal sealing.

The invention also relates to a method of producing packs for cigarettes, in particular of the type mentioned above, and to a corresponding apparatus for producing packs for cigarettes, in particular of the type mentioned above.

2. Prior Art

A cigarette pack of the type mentioned above is known in practice. In the case of this prior art, a cigarette block or a sealed block with a cigarette group is arranged in a hinge-lid box as an outer pack. The blank of the inner wrapper is provided with an opening aid which can be used a number of times. This opening aid comprises a closure tab, which is defined by punched lines within the blank of the inner wrapper, and an outer activating tab, which covers over the closure tab and is provided with an adhesive. In order to open and close the sealed block, the user grips the actuating tab. The blank of the sealed block is folded around the cigarette group such that folding flaps which cover over one another are produced in the region of narrow side surfaces and in the region of a base. The envelope-arrangement folding flaps are connected to one another by thermal sealing. An inner collar made of cardboard is positioned within the sealed block, this inner collar having side flaps in the region of the side surfaces, and a base flap in the region of the base surface, each for protecting the cigarettes against heat and pressure during the thermal sealing of the folding flaps.

BRIEF SUMMARY OF THE INVENTION

The invention deals with improvements to this and similar (cigarette) packs, in particular relating to prerequisites for high-performance production of the packs.

A pack according to the invention is a pack for piece-form articles, in particular for cigarettes, comprising an outer pack, preferably configured as a hinge-lid box, and an inner pack as a sealed block with an inner blank which encloses the pack contents, in particular a cigarette group, and is made of preferably aroma-tight and moisture-tight, thermally sealable sheet material, the inner pack having, in the region of an inner end wall, an opening aid which can be used a number of times and, in the region of side walls of the inner pack, folding flaps which are connected to one another by thermal sealing, characterized in that, folding flaps in the region of an inner rear wall of the inner blank are designed as a fin fold and are connected to one another by thermal sealing outside the region of the cigarette group to form a fin seam, wherein the fin seam is arranged at a spacing from regions of folding flaps which cover one another multiple times in the region of the inner side walls. Accordingly, it is provided that folding flaps in the region of an inner rear wall of the inner blank are designed as a fin fold and are connected to one another by thermal sealing outside the region of the cigarette group to form a fin seam, wherein the fin seam is arranged at a spacing from regions of folding flaps which cover one another multiple times in the region of the inner side walls.

The invention selects special folding for the sealable inner wrapper which does not transmit any thermal or mechanical loading to the ends of the cigarettes. The fin seam does not transmit any heat and pressure to the cigarettes. In the region of the side surfaces, folding flaps which cover over one another can be connected to one another by being sealed against the side limbs of an inner collar. The inner collar can be designed as a straightforward blank, in particular with a U-shaped cross section, that is to say with supporting or protective tabs merely in the region of the narrow side walls, but not in the region of the rear wall which has the fin seam.

According to a preferred configuration of the invention, it is provided that folding flaps of the inner blank are folded in the manner of an envelope with the incorporation of corner flaps of the inner blank, and that the fin seam is arranged outside a region of the folding flaps and corner flaps which overlap one another in the region of the envelope fold, in particular at a small spacing of a few millimeters, preferably at a spacing of from 2 to 3 millimeters, from a region of overlapping corner flaps and folding flaps.

A further special feature consists of the fact that folding flaps of the inner blank are folded in the region of the inner side walls with the formation of alternating coverage in the plane of the inner side walls, and are connected to one another by thermal sealing, those folding flaps of the inner rear wall which have the fin seam bearing against the pack contents, and the folding flaps of the inner front wall being folded in each case onto those folding flaps of the inner rear wall which have the fin seam.

A method according to the invention is a method of producing packs for cigarettes, having an outer pack preferably configured as a hinge-lid box, and an inner pack as a sealed block with an inner blank which encloses the pack contents, in particular a cigarette group, and is made of preferably aroma-tight and moisture-tight, thermally sealable sheet material, the inner pack having, in the region of an inner end wall, an opening aid which can be used a number of times and, in the region of side walls of the inner pack, folding flaps which are connected to one another by thermal sealing, characterized in that the pack contents are conveyed, by the supplied inner blank, into the pocket of a folding turret, with the pack contents being wrapped partially in the inner blank, and in that folding flaps in the region of an inner rear wall of the inner blank are connected to one another by thermal sealing to form a fin seam in the folding turret, in particular in a plurality of successive sealing stations, which are arranged on the circumference of the folding turret, while the cyclically driven folding turret is at a standstill, and in that end regions of the fin seam are folded over into the plane of inner side walls in such a way that they are arranged at a spacing (A) from regions of folding flaps which cover one another multiple times, in the region of the inner side walls. Accordingly, it is provided that the pack contents are conveyed, by the supplied inner blank, into the pocket of a folding turret, with the pack contents being wrapped partially in the inner blank, and that folding flaps in the region of an inner rear wall of the inner blank are connected to one another by thermal sealing to form a fin seam in the folding turret, in particular in a plurality of successive sealing stations, which are arranged on the circumference of the folding turret, while the cyclically driven folding turret is at a standstill, and that end regions of the fin seam are arranged at a spacing from regions of folding flaps which cover one another multiple times, in the region of the inner side walls.

One particular development of the method according to the invention relates to the sequence, in which the folding flaps are folded into the region of the inner side wall, namely, after the sealing of the fin seam in the region of the inner rear wall and the folding over of the fin seam against the inner rear wall, folding flaps of the inner blank are folded into the region of the inner side walls with covering of corner flaps of the inner blank and are sealed to one another, wherein, first of all, the corner flaps are folded into the plane of the inner side walls and, afterward, folding flaps of the inner rear wall with end regions of the fin seam and, furthermore, folding flaps of the inner front wall, and in that the inner side walls are sealed completely afterward.

In one preferred embodiment of the method according to the invention, the formation of the sealed block is distributed to three conveyors, namely two (folding) turrets and a flat conveyor which is arranged between them. The sealing of the folding flaps preferably takes place in two steps on the two turrets.

A further special feature consists of the lateral feeding of the inner collars to the cigarette groups, namely, the pack contents, prior to the inner blank being fed, are fed an inner collar, which is positioned in a U-shaped manner in a turret and into which the cigarette group, as pack contents, is then pushed, and in that the pack contents with inner collar are conveyed out of the turret and conveyed into the folding turret by the supplied inner blank, preferably in such a way that the inner blank is fed to the folding turret from above, the inner collar being fed to the turret from the side, in particular in each case as a continuous material web, which is then cut up into individual blanks.

A special feature likewise consists of the fact that, during conveying of the pack contents with inner collar into pockets of the folding turret, the inner blank is held in readiness and is driven by the pack contents, the inner blank being placed through an orifice against the pack contents and/or the inner collar. The dimension of the orifice can be modified, in order to either place the inner blank against the pack contents or to provide space for a pusher which feeds a folding flap of the inner blank to a sealing bar.

The way in which the fin seam is sealed on the folding turret laterally next to the pockets of the latter, is also of particular significance, namely, in that, during feeding of the pack contents into a pocket of the folding turret, a folding flap of the inner blank for the fin seam is placed against a sealing bar which is assigned to the pocket by way of a pusher nose which is formed on a pusher for the pack contents, and is held there by vacuum, in particular by at least one suction channel, wherein the sealing bar is preferably arranged laterally next to the pocket and at a spacing from the circumference of the folding turret, and in that a further folding flap for the fin seam is guided by the circumference of the folding turret through a sealing jaw of a sealing station to the sealing bar and is sealed with the first folding flap by the application of pressure and heat to the fin seam.

An apparatus according to the invention is an apparatus for producing packs for cigarettes, having an outer pack preferably configured as a hinge-lid box, and an inner pack as a sealed block with an inner blank which encloses the pack contents, in particular a cigarette group, and is made of preferably aroma-tight and moisture-tight, thermally sealable sheet material, the inner pack having, in the region of an inner end wall, an opening aid which can be used a number of times and, in the region of inner side walls and an inner base wall, folding flaps which are connected to one another by thermal sealing, characterized by a folding turret with pockets for receiving pack contents in each case with an inner blank positioned around the same, and by preferably a plurality of sealing stations, which are arranged on the circumference of the folding turret and are intended for sealing folding flaps in the region of an inner rear wall for the inner blank in the manner of a fin seam while the cyclically driven folding turret is at a standstill, and with one or more folding means for folding the fin seam against the inner rear wall and the inner side walls, in such a way that end regions of the fin seam are arranged at a spacing (A) from regions of folding flaps which cover one another multiple times, in the region of the inner side walls.

Preferred embodiments and advantageous developments of the apparatus according to the invention result from the subclaims.

BRIEF DESCRIPTION OF THE DRAWINGS

A preferred exemplary embodiment of the invention will be described hereinbelow with reference to the drawing, in which:

FIG. 9 shows a vertical section through the apparatus taken along section line IX-IX in FIG. 6.

FIGS. 10 and 11 show a detail of the apparatus according to FIG. 8 in the region X in an enlarged side view, during different phases of the movement sequence.

FIG. 13 shows an enlarged side view of part of the apparatus, in the region XIII of FIG. 8.

FIG. 14 shows a side view for illustration according to FIG. 13.

DETAILED DESCRIPTION OF PREFERRED EMBODIMENTS

Figure 2:
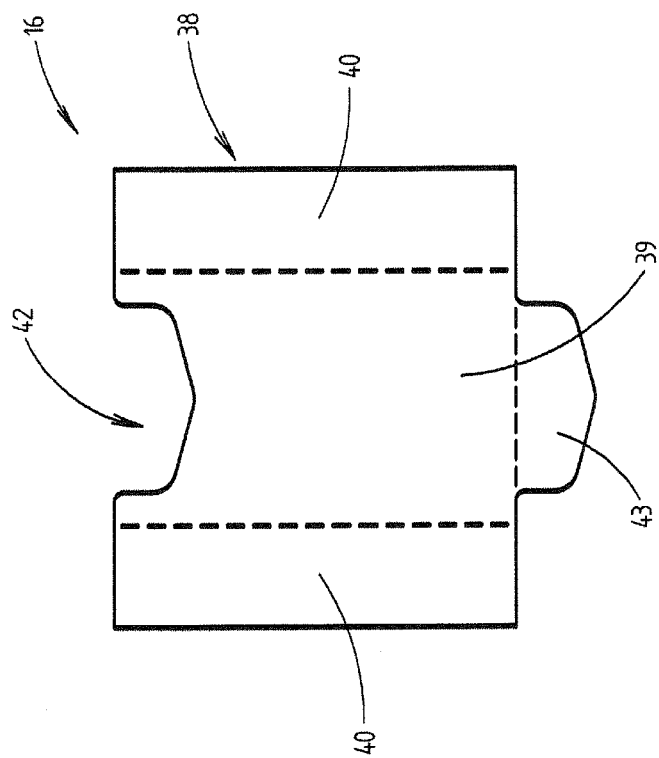
FIG. 2 shows a blank for an inner collar in a spread-out, that is to say non-folded, position.

The pack 10 illustrated here is intended predominantly for receiving cigarettes, wherein a number of cigarettes are combined to form a cigarette group 11 as pack contents. The (cigarette) pack 10 is constructed from an outer pack 12 and an inner pack 13. The outer pack 12, in the present case, is a hinge-lid box of standard construction, that is to say with a box part 14 (at the bottom) and a lid 15 (at the top) and, if appropriate, a collar 16. The outer pack 12 may also be designed in some other way, in particular as a shell-and-slide pack or as a shoulder box.

The box part 14 and lid 15 comprise a single-piece blank (not shown) with regions for a box front wall 17, base wall 18, box rear wall 19, lid rear wall 20, end wall 21 and lid front wall 22. The box side walls 23 and lid side walls 24 each comprise side flaps which cover over one another, that is to say they are of double-layered design.

A block-form inner pack 13, to be precise configured as a sealed block 25, is arranged within the outer pack 12 designed in this way. The pack contents are, in particular the cigarette group 11 is, enclosed on all sides by an inner blank 26 which is made of sheet material and has a composition which renders it preferably moisture-tight and aroma-tight. Furthermore, the material of the inner blank 26 is thermally sealable, and therefore folding flaps can be connected to one another by heat and pressure.

One special feature of the sealing block 25 or of the inner blank 26 is an opening aid which can be used a number of times, that is to say is recloseable. This opening aid comprises an opening tab 27, which exposes a removal opening in an inner film or film layer. The opening tab 27 here is bounded by a U-shaped weakening line 28, that is to say by perforations, by a continuous punched line or by some other suitable material weakening. For opening the sealed block 25, the opening tab 27 is moved into the open position with the aid of an actuating means, that is to say of an actuating tab 29.

The actuating tab 29 is part of the inner blank 26 or part of an outer layer of the inner blank 26. The actuating tab 29 is bounded by an essentially U-shaped weakening line or punched line 30. The actuating tab 29 is larger than the opening tab 27 and covers over the latter by way of a (U-shaped) closure strip 31, which is formed preferably on three sides. This closure strip butts against a peripheral strip which encloses the removal opening and belongs to an inner layer, as a carrier of the opening tab 27. The actuating tab 29 is provided, at least in the region of the closure strip 31, with a permanently acting adhesive.

The blank for the sealed block 25, that is to say the inner blank 26, is divided up by folding lines into regions for an inner front wall 32, an inner end wall 33 and an inner rear wall 34. Side strips for forming interconnected inner side flaps 35 extend on either side along the full length of the inner blank 26. Folding flaps 108, 109 are formed at free ends of the elongate inner blank 26 in the region of the inner rear wall 34, and extend over the entire width of the inner blank 26. These folding flaps are connected to one another in a specific manner to form a fin seam 37.

For the purpose of gripping the actuating tab 29, the latter is provided centrally, in the region of the inner front wall 32, with a grip tongue 45. The latter is located in an adhesive-free region. The grip tongue 45 is fitted such that it is always located above the box front wall 17, that is to say can be gripped freely. Furthermore, the grip tongue 45 is folded over preferably against the actuating tab 29 and fixed there by an adhesive. This makes it easier for the actuating tab 29 to be gripped.

A further special feature is the design of the sealed block 25 and/or the folding of the inner blank 26. The inner blank 26 is folded such that projecting folding flaps 108, 109 of the inner blank 26 are arranged at the rear, that is to say in the region of an inner rear wall 34, to form the fin seam 37. In this region, thermal sealing of the folding flaps 108, 109 can be achieved without pressure and/or heat being transmitted to the ends of the cigarettes. The transversely projecting fin seam 37 is then folded over against the inner rear wall 34. End regions of the fin seam 37 projecting peripherally over the pack contents are then folded laterally together with the corresponding folding flap 110, into the plane of the inner side walls 35 of the sealed block 25. Above this, the folding flaps 111 which protrude out of the plane of the inner front wall 32 are subsequently placed and sealed.

In order to protect the pack contents, that is to say the cigarettes, during sealing of the side flaps in the region of the inner side walls 35, a covering is arranged within the sealed block 25, this covering extending at least in the region of the inner side walls 35, of the inner front wall 32. There is a covering provided in the region of the inner rear wall 34. This covering, in this case is an inner collar 38 (FIG. 2), which partially encloses the cigarette group 11.

In the case of this exemplary embodiment, the inner collar 38 extends over the entire length and/or height of the cigarette group 11 with a collar front wall 39 in the front region. Collar side walls 40 are folded over against lateral regions of the cigarette group 11 and extend in the region of the inner side walls 35, in order to cover the cigarette group 11 in relation to heat and pressure. A cutout 42 in the region of the collar front wall 39 allows the cigarettes to be removed when the sealed block 25 is open. A further special feature is an extension 43 which is formed at the lower end of the collar front wall 39, opposite the cutout 42, such that the inner collar 38 can be severed in an essentially waste-free manner from a continuous material web 54.

Figure 3:
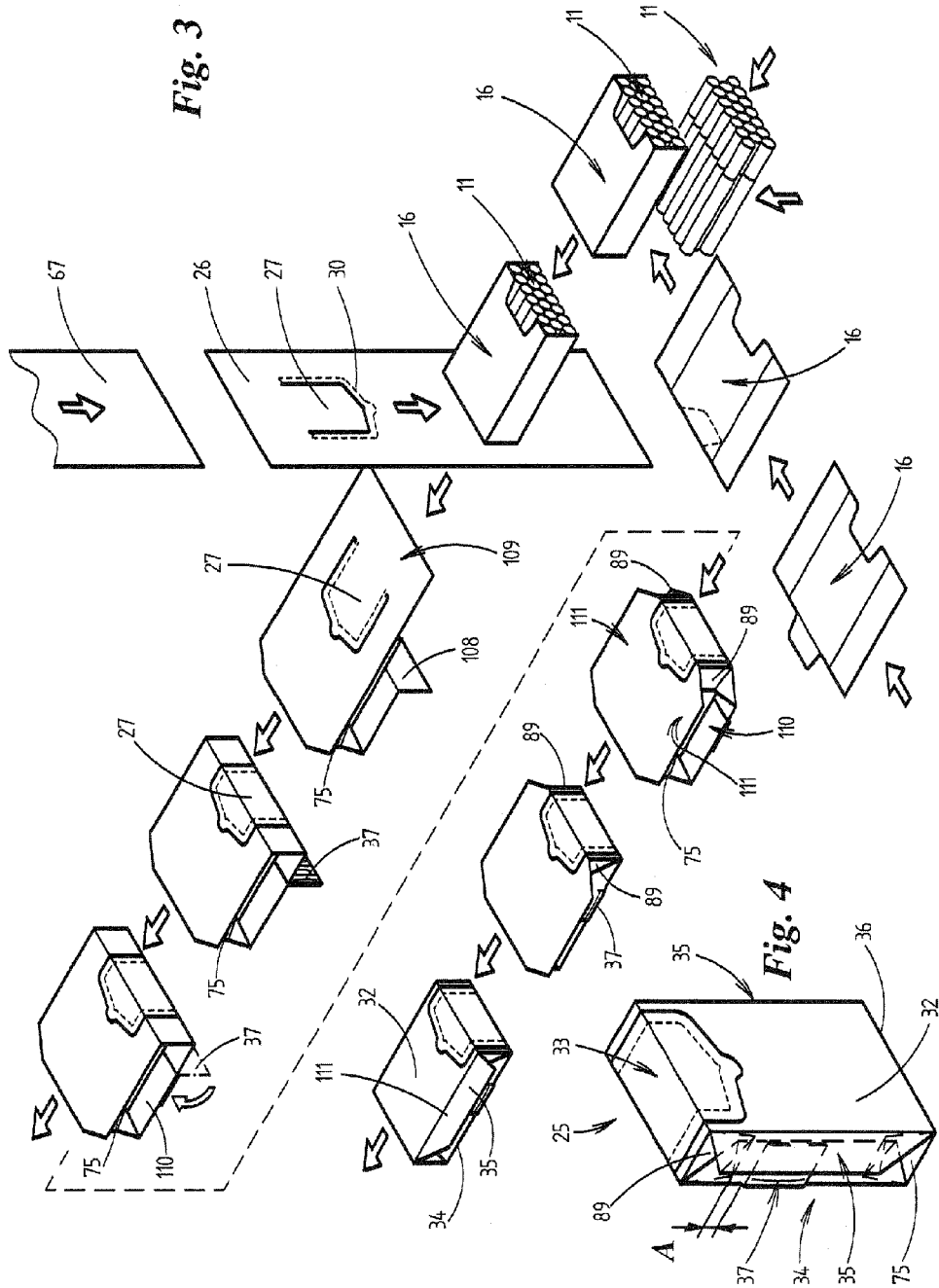
FIG. 3 shows a schematic illustration for the operation of folding a sealed block.

The method of producing the sealed block 25 (FIG. 3) constitutes a special feature. In the first instance a blank for the inner collar 38 is folded in the form of a U and the extension 43 is placed into the plane of the inner base wall 36 and fed to the cigarette group 11 formed. Thereafter, prepared inner blanks 26 are supplied, that is to say are fed in a (vertical) transverse plane. The cigarette group 11 is positioned such that filter ends are oriented backward in the transporting direction. In conjunction with guides and/or folding mechanisms, transportation causes the inner blank 26 to be folded in a U-shaped manner around the cigarette group 11 and inner collar 38.

Figure 5:
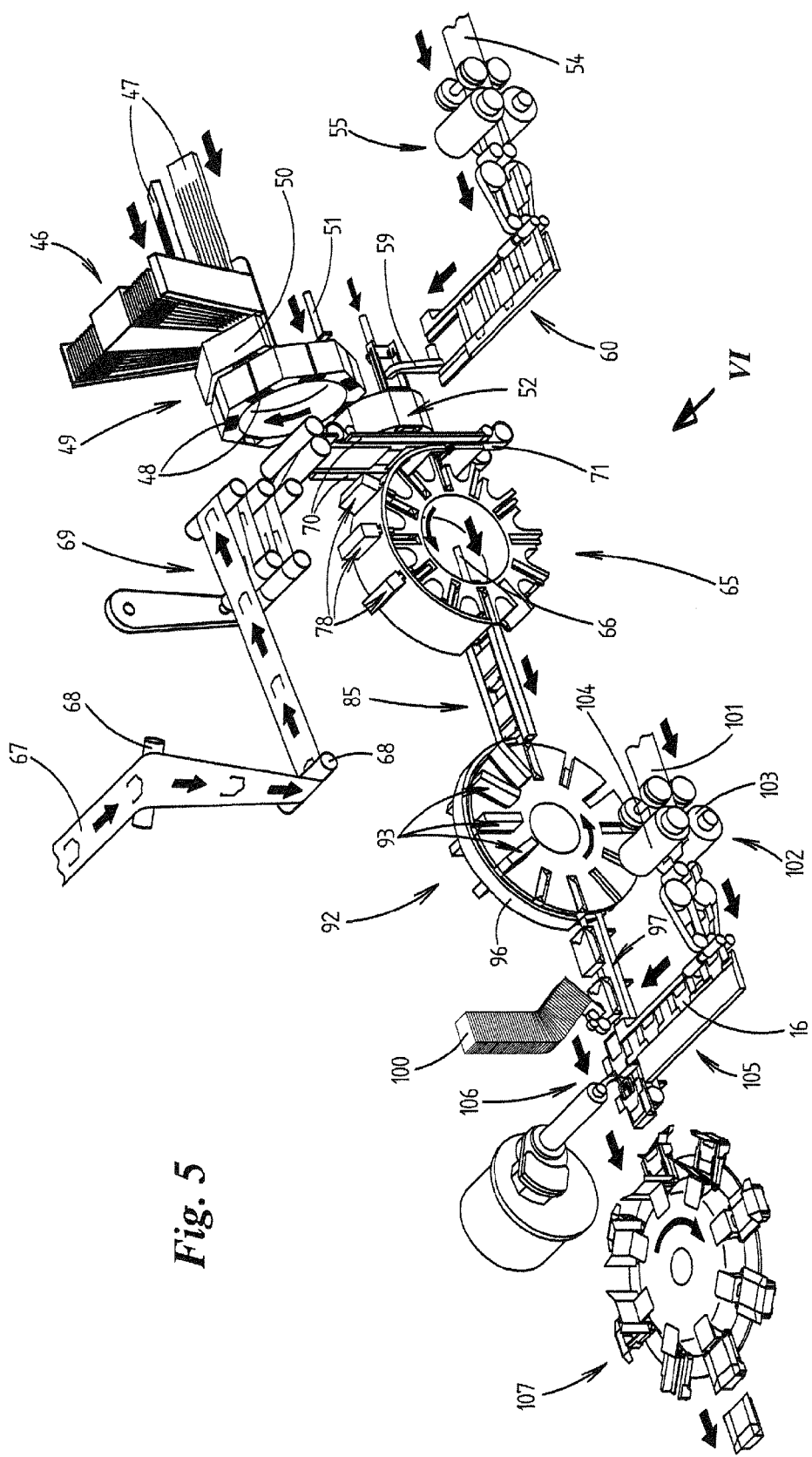
FIG. 5 shows a schematic, three-dimensional illustration of an apparatus for producing the packs according to FIG. 1.

In the first U-folding step, front corner flaps 75 are also folded (FIG. 5). This is followed by the folding in the region of the inner rear wall 34, that is to say the production of the fin seam 37 and the sealing thereof. Next, the fin seam 37 is folded over against the inner rear wall 34 and rear-side corner flaps 89 are folded. Subsequently, the folding flaps 110, 111 are folded into the region of the inner side walls 35. Subsequently, the sealing of the folding flaps 110, 111 which overlap one another takes place. The sealed block 25 produced in this way is introduced in a suitable manner into the outer pack 12.

One special feature is that the fin seam 37 is arranged at a spacing from the corner flaps 75, 89 and folding flaps 110, 111 which overlap multiple times, in the region of the inner side wall 35. The key here is, in particular, the region, in which the folding flaps 110, 111 which are folded in the manner of an envelope and the corner flaps 75 and 89 overlap, which produces a multiple-layer construction. The fin seam 37 is arranged at a spacing A from this region. This spacing A is preferably a few millimeters, in particular from 2 to 3 millimeters.

Figure 1:
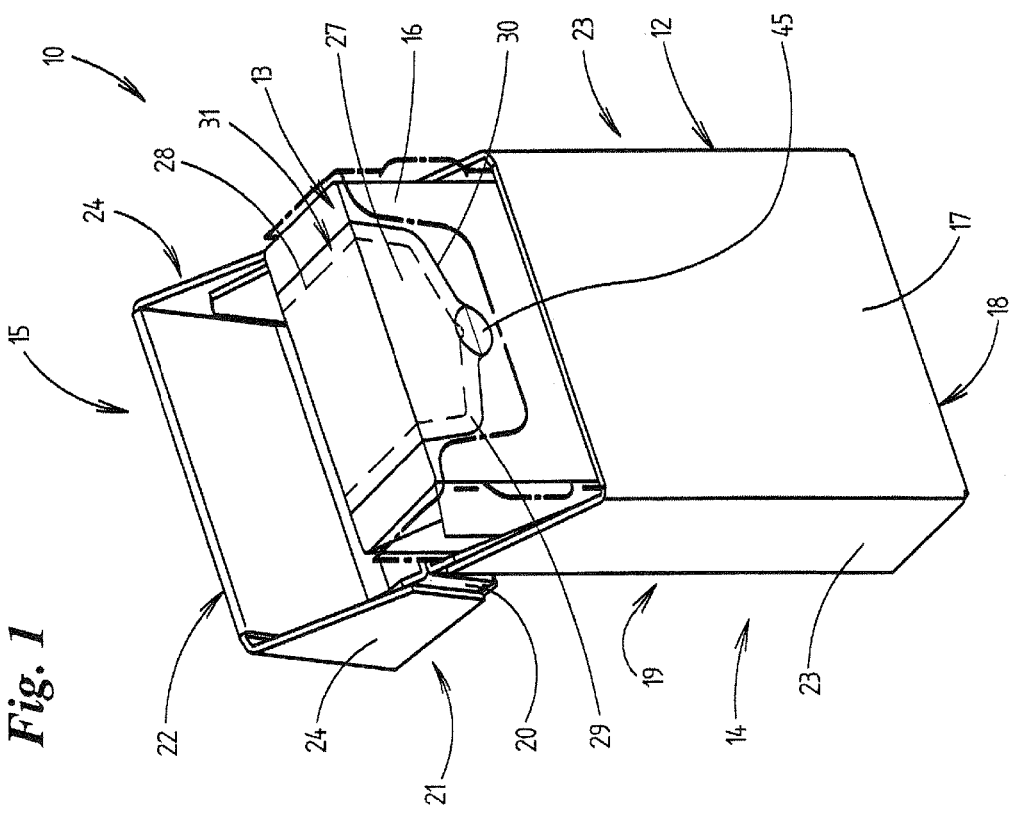
FIG. 1 shows a three-dimensional illustration of a (cigarette) pack of the hinge-lid-box type.
Figure 6:
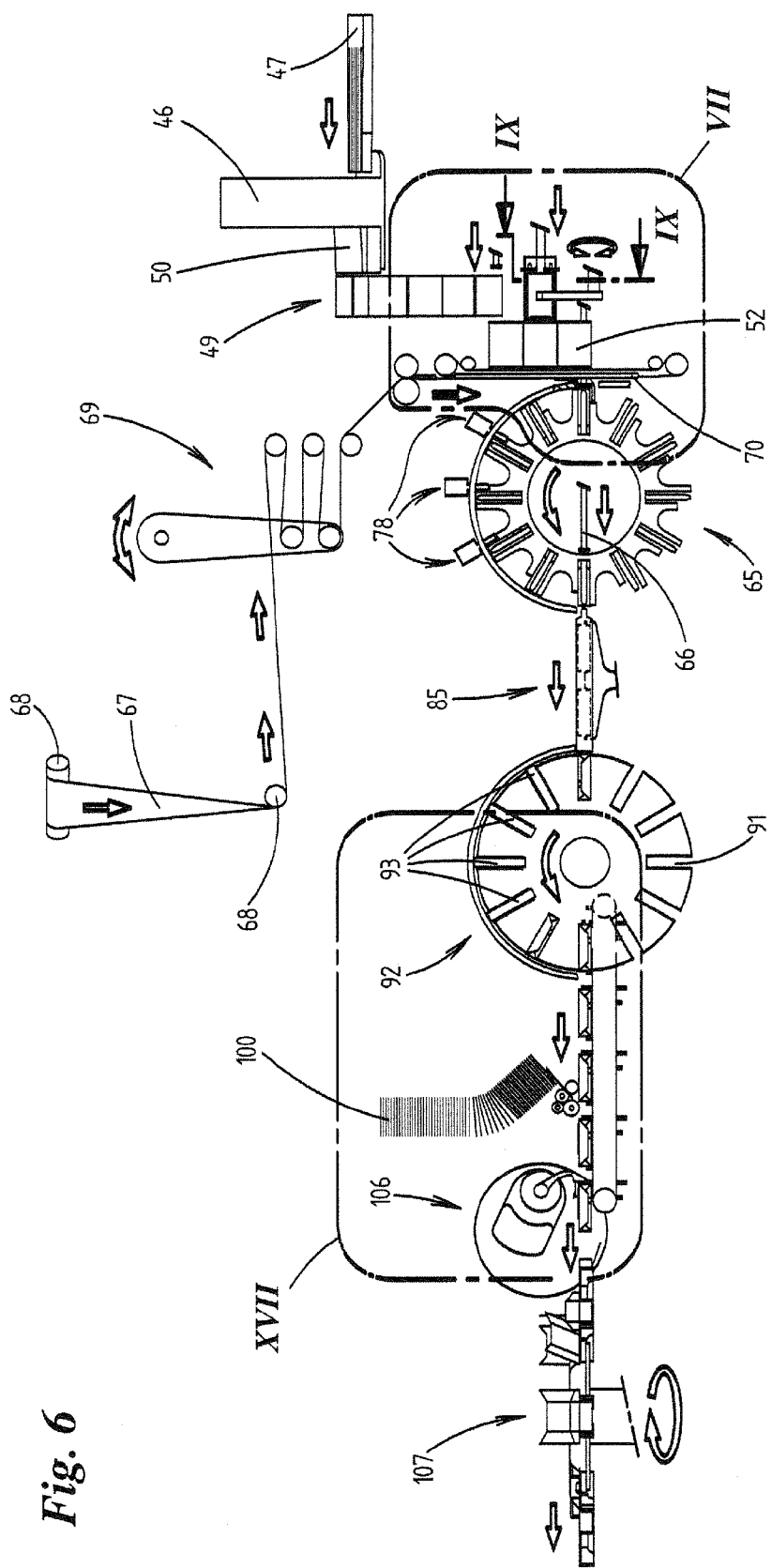
FIG. 6 shows a side view of the apparatus according to FIG. 5.

A preferred apparatus and a method of producing the packs 10 shown in FIG. 1 will be explained hereinbelow. FIGS. 5 and 6 respectively show a schematic, three-dimensional illustration and a side view of an appropriate apparatus.

The cigarettes are supplied in upright shafts of a cigarette magazine 46 and are pushed out of the cigarette magazine 46 in a known manner by push-rod assemblies 47. Each push-rod assembly 47 here grips a group 11 of cigarettes located one beside the other and one above the other, and pushes these out of the cigarette magazine 46 into pockets 48 of a turret 49. In addition, a cigarette diverter 50, which determines the cigarette formation, is arranged between the cigarette magazine 46 and turret 49.

The push-rod assemblies 47 are operated together for each second cycle of the turret 49, and therefore two pockets 48 are filled during each standstill phase of the turret 49. The turret 49 is then moved on again two positions, and therefore the next cigarette groups 11 can be introduced.

The turret 49 is arranged transversely to the pushing-out direction of the push-rod assemblies 47 and rotates about a horizontal axis. The cigarette groups 11, accordingly, are pushed laterally into pockets 48, which are located in an upper position.

The cigarette groups 11 are pushed out in a lower position following rotation of the turret 49 in several stages. For this purpose, use is made of a pusher 51, which pushes out a cigarette group 11 in the horizontal direction and pushes it into pockets 53, which are arranged on a following turret 52. The inner collars 38 folded in a U-shaped manner are already located in these pockets 53 at this point in time.

Figure 7:
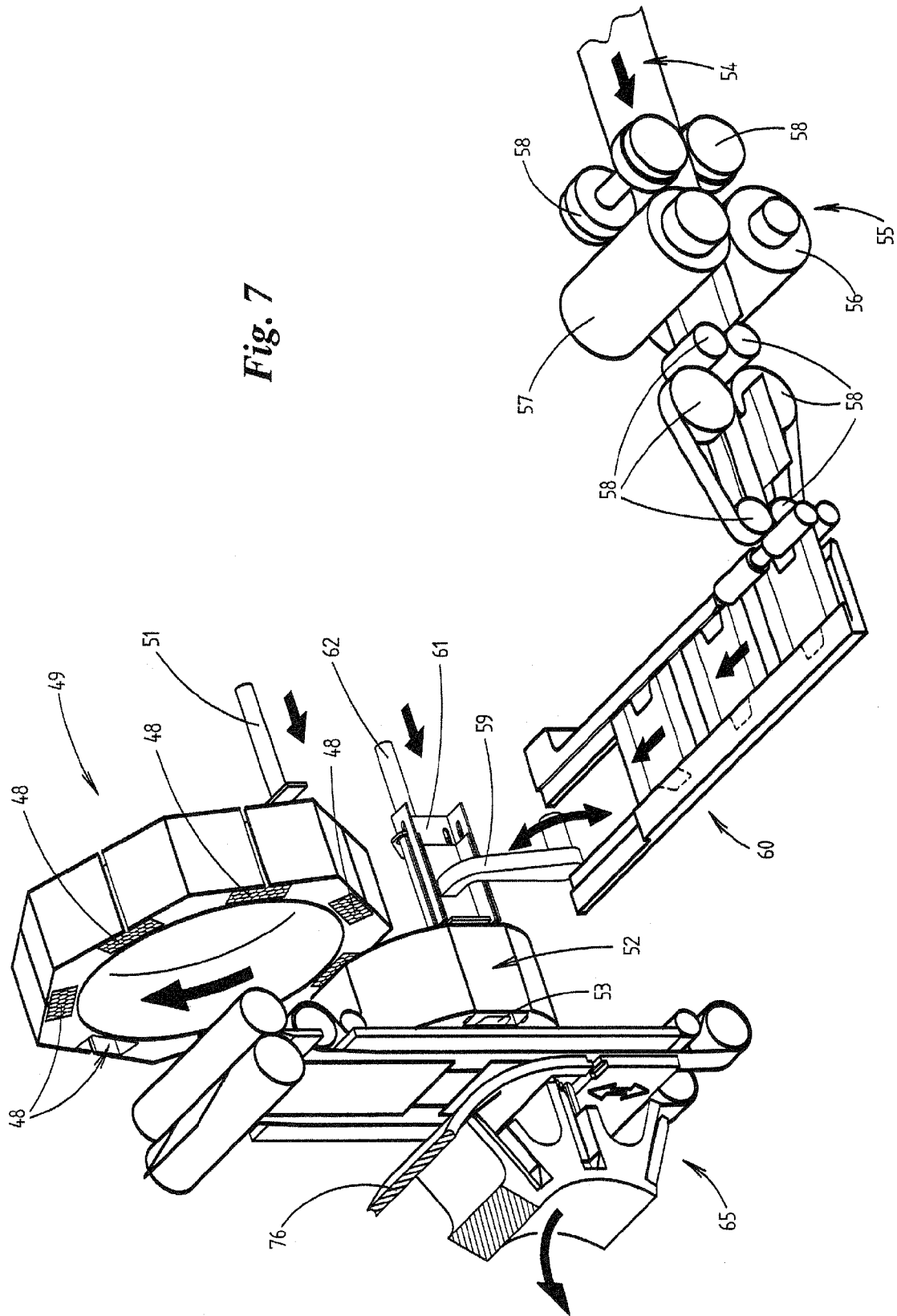
FIG. 7 shows an enlarged three-dimensional illustration of part of the apparatus in the region VII in FIG. 5.
Figure 8:
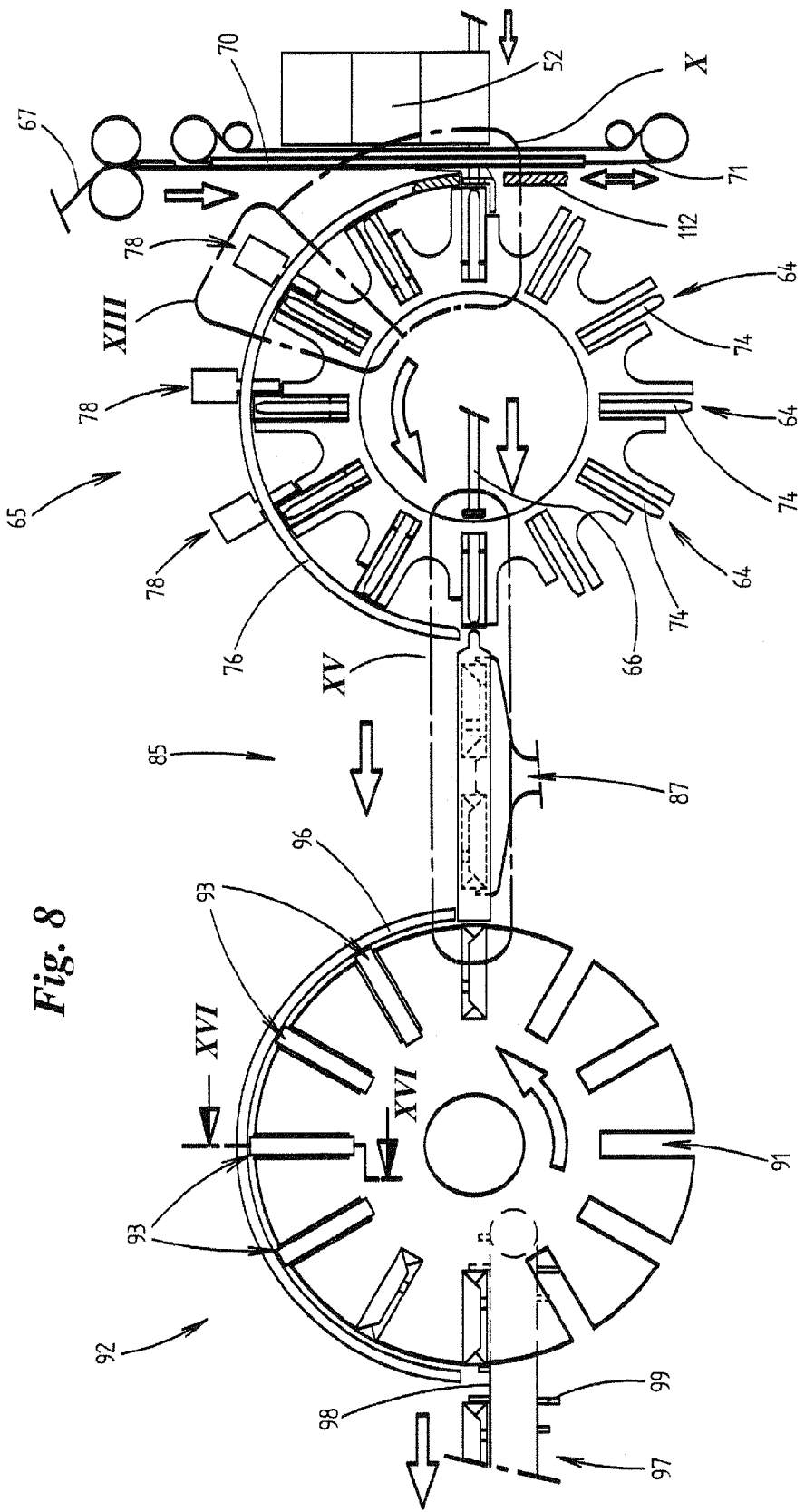
FIG. 8 shows an enlarged side view of part of the apparatus according to FIG. 5.

The inner collars 38 are fed to the turret 52 in a substantially horizontal plane. This is shown in FIG. 7. The inner collars 38 are transported, in the form of a continuous material web 54, along a horizontal conveying path and are separated by a cutting device 55. The cutting device 55, in the present case, comprises a blade roller 56 and an associated mating roller 57, which sever the material web 54 in a known manner.

Thereafter, the severed inner collars 38 are spaced apart from one another by successive conveying-roller pairs 58 and are conveyed away along the transverse conveyor 60 into the region of a ram 59, by way of which the inner collars 38 are removed one after another from the transport track 60 and are pressed into a forming pocket 61 by pivoting of the ram 59 by 90°. In the process, the inner collar 38 is folded into the U-shape. During the transport of the inner collars 38 along the transverse conveyor 60, the extension 43 is also folded over partially, namely transversely with respect to the collar front wall 39. This can take place using suitable folding means such as folding diverters.

The folded inner collar 38 is then conveyed by a pusher 62, which acts on the forming pocket 61, into a pocket 53 of the cyclically driven turret 52 and is transferred to said pocket 53.

Once the folded inner collars 38 have been introduced into the pocket 53 of the turret 52, the turret 52 is moved on cyclically by two positions, and therefore the cigarette groups 11 can be pushed in this station along a horizontal plane into the pockets 53 and combined with the inner collars 38 supplied therein. Following further rotation of the turret 52 through 180°, the cigarette group 11 with the inner collar 38 folded around it can be pushed out in the horizontal plane. For this purpose, use is made of a further pusher 63.

With the aid of the pusher 63, the cigarette groups 11 with inner collar 38 folded around the same are pushed into pockets 64 of a folding turret 65 which follows. The folding turret 65 also rotates about a horizontal axis, and is driven cyclically like the turret 52. The folding turret 65 is of drum-like design with a pusher 66 for pushing out inner packs 13. The folding turret 65 and the turret 52 are arranged in planes which are offset by 90° with respect to one another, in each case one radially arranged pocket 64 being arranged so as to be flush with a pocket 53 for the transfer of the cigarette groups 11.

While the cigarette groups 11 with collar 38 folded around the same are transferred from the turret 52 onto the folding turret 65, the inner blank 26 is fed and wound around the cigarette group 11 and the inner collar 38.

The inner blank 26 is fed from above, that is to say in the form of a continuous material web 67, which is guided into the region of a pendulum-type store 69 via a plurality of deflecting rollers 68. Following the region of the pendulum-type store 69, individual inner blanks 26 are severed from the material web (not shown in detail). The separated inner blanks 26 are then transferred peripherally by two spaced-apart suction conveyors 70 and kept in supply along the conveying route of the cigarette groups 11. The suction conveyors 70 are spaced apart such that the cigarette groups 11 can be moved through between the two suction conveyors 70, or conveying strands 71 of the same, while carrying along the inner blank 26. The inner blank 26 here is folded in a U-shaped manner around the cigarette group 11 with inner collars 38. The inner collars 38 are retained by means of negative pressure on the conveying strands 71 of the suction conveyor 70. For full disclosure of this, reference is made to the Applicant's EP 0 031 515 B1, which discloses the construction of such conveying mechanisms.

The folding turret 65 is driven cyclically and has a number of radially directed pockets 64 for receiving a cigarette group 11, with inner collar 38, which is wrapped partially in the inner blank 26. Arranged laterally on the pockets 64 are folding fingers 74, which are likewise oriented radially and by means of which corner flaps 75 of the inner end wall 33, which project beyond the cigarette group 11 on either side of the inner end wall 33, are positioned against the collar side walls 40 while the cigarette group 11 with the inner blank 26 is pushed into the pocket 64 (FIG. 10).

Figure 11:
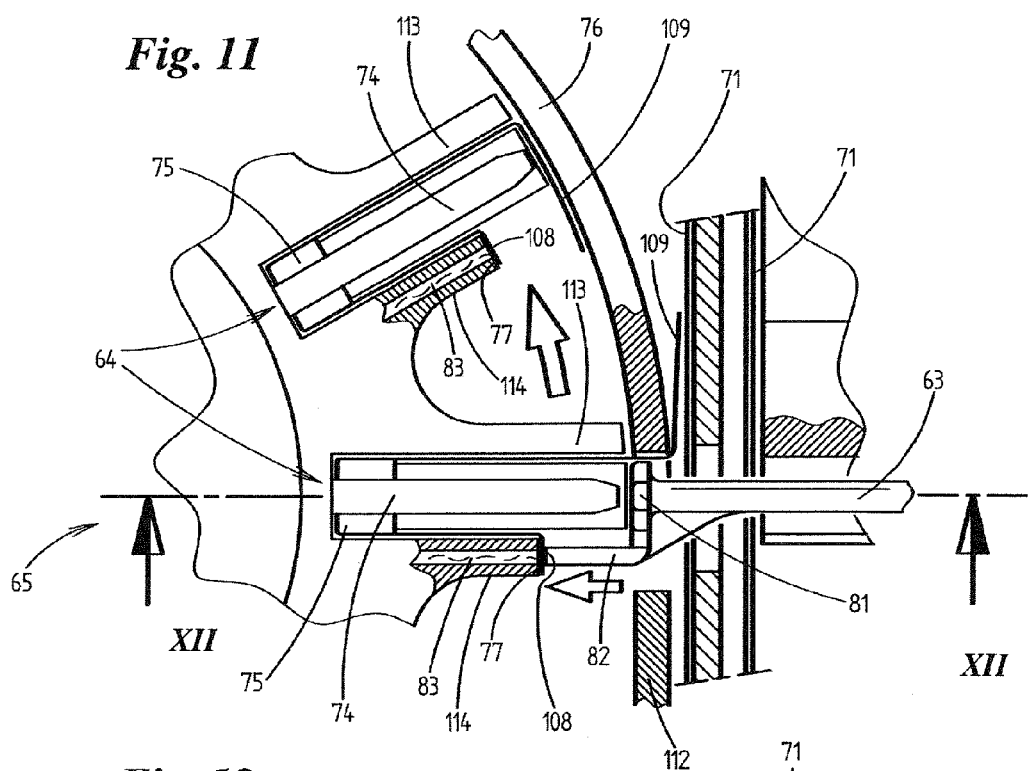
Figure 12:
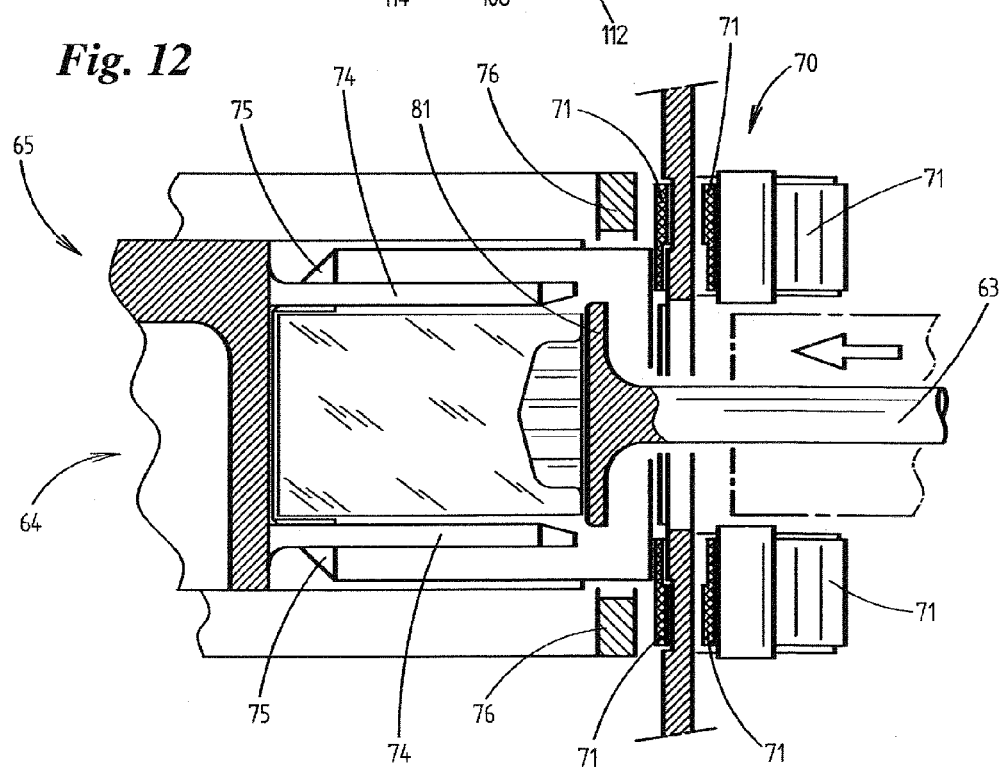
FIG. 12 shows a section through the apparatus taken along section line XII-XII in FIG. 11.

Here, one special feature consists of the fact that the pusher 63 has an upright pusher plate 81 which is intended to bear against the inner end wall 33 of the inner pack 13. Furthermore, a pusher nose 82 which projects in the conveying direction is formed below the pusher plate 81. The pusher nose 82 extends in the region of the inner rear wall 34 and ensures that a lower folding flap 108 of the inner blank 26 for the fin seam 37 is placed against a sealing bar 77 which is assigned to each pocket 64 and has a plurality of suction channels 83 which are spaced apart from one another (FIG. 11). The pusher nose 82 protrudes with respect to the pusher plate 81 to such an extent that an edge region of the folding flap 108 is pressed against the sealing bar 77 of the pocket 64, where it is held by means of vacuum. In the region of the abovedescribed pushing-in station, an outer guide 76 is arranged on the circumference of the folding turret 65, and this outer guide results in a folding flap 109 which projects initially radially out of the pocket 64, for the purpose of forming the fin seam 37, being positioned against the circumference of the folding turret 65 as soon as the folding turret 65 is moved on again by one position. In this way, a folding flap 109 is located on the circumference of the folding turret 65 laterally next to the cigarette group 11, and another folding flap 108 is located on the sealing bar 77 of the respective pocket 64.

In an extension of the outer guide 76, a corresponding guide 102 which can move in the vertical direction is additionally arranged in the region of the pushing-in station. Together with the lower free end of the outer guide 76, the corresponding guide 102 serves to form an orifice, through which the cigarette group 11 is guided with the inner blank 26. The inner blank 26 is placed against the cigarette group 11 and/or the collar 18 by the corresponding guide 102 and the outer guide 76. In addition, the corresponding guide 102 and the outer guide 76 are positioned at such a spacing from one another that the inner blank 26 is pressed against the cigarette group 11 and/or the collar 18. The friction which is produced prevents the inner blank 26 from being displaced, in particular being skewed or slipping, with respect to the cigarette group 11 while being pushed in (FIG. 10). This measure is associated with the fact that pocket walls 113, 114 of the pocket 64 have a different length. A pocket wall 113 extends over the complete length of the cigarette group 11, whereas the pocket wall 114 which lies opposite is shorter and has the sealing bar 77. Accordingly, while being pushed in, the inner blank 26 first of all comes into contact with the longer pocket wall 113 and might be displaced in the process, unless the inner blank 26 were pressed against the cigarette group 11 and/or the collar 18.

After the cigarette group and the collar 18 have been pushed into the pocket 64, the corresponding guide 102 is spaced apart further from the outer guide 76, in order to make the passage of the pusher 63 possible (FIG. 11).

A further special feature is that in the first instance sealing takes place of the fin seam 37 in the region of the inner rear wall 34, and only then is this followed by the sealing of the folding flaps 110, 111 in the region of the inner side walls 35.

The operation of sealing the fin seam 37 takes place in three sealing stations 78 during cyclic transportation of the inner packs 13 on the folding turret 65. The sealing stations 78 each contain a sealing mechanism, for example a heatable sealing jaw 79, on the circumference of the folding turret 65. The sealing jaw 79 can be moved by a drive (not shown) in the radial direction in relation to the folding turret 65 in order to seal the two folding flaps 108, 109 of the inner blank 26 for the fin seam 37 by pressure and heat. The sealing jaw 79 here is moved through a cutout 80 in the outer guide 76, driving the second folding flap 109 for the fin seam 37 against the sealing bar 77. Following (partial) sealing of the fin seam 37, the sealing jaw 79 is spaced apart from the sealing bar 77, and therefore the folding turret 65 can be moved on by one station.

In the present exemplary embodiment, the folding turret 65 has twelve pockets 64. The three sealing stations 78 are located in an 11-o'clock position, a 12-o'clock position and 1-o'clock position. Sealing of the folding flaps 108, 109 of the inner blank 26 in the region of the fin seam 37 takes place in each sealing station 78 to give, overall, a sufficiently sealed and/or tight connection. Depending on the circulating times on the folding turret 65, it is also possible to provide a greater number or a smaller number of sealing stations 78.

During the production of the fin seam 37, the folding flaps 110, 111 of the inner blank 26 for the inner side walls 35 are not yet folded and project essentially laterally. These side flaps are folded only once pushing out of the inner packs 13 from folding turret 65 has taken place.

In a push-out station of the folding turret 65, in a 9 o'clock position, the partially sealed inner packs 13 are pushed out of the folding turret 65, with the fin seam 37 pointing upward in the region of the inner rear wall 34, and are transferred to a horizontal conveyor 85. This takes place by way of the pusher 66 which is arranged in the interior of the folding turret 65 of drum-like configuration. Said pusher 66 pushes the inner packs 13 into the region of the adjacent conveyor 85. Here, the fin seam 37 is placed or folded counter to the conveying direction against the inner rear wall 34 by a lower end of the outer guide 76.

The conveyor 85 is also driven cyclically and has lateral guides 86 with a C-shaped cross section, in which lateral guides 86 the inner packs 13 which are arranged at a spacing from one another can be displaced cyclically along the horizontal conveyor 85. A pusher 87 which grips in each case two inner packs 13 by way of a drive (not shown) and transports them one position further serves for this purpose. On its upper side, the pusher 87 has two depressions 88 which are dimensioned in each case to receive an inner pack 13. As a further special feature, the guides 86 have a folding finger 90 in the inlet region, for folding over the further corner flaps 89 on both sides.

Figure 4:
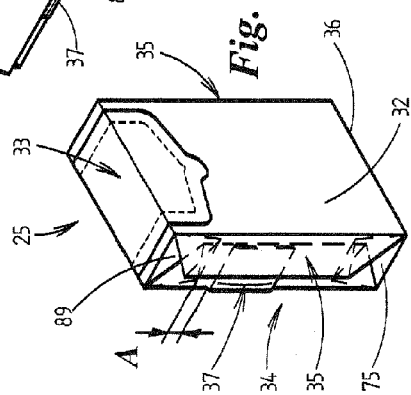
FIG. 4 shows a folded sealed block.

Afterward, during the transport of the inner pack 13, the folding flaps 110, 111 are folded in the region of the inner side walls 35. This can take place by way of folding diverters (not shown), which is known in principle from the prior art. A further special feature, however, lies in the sequence of the folding. First of all, namely, the folding flaps 110 which protrude laterally in the region of the inner rear wall 34 and also have the fin fold 37 are folded against the pack contents, and afterward the folding flaps 111 which protrude laterally in the region of the inner front wall 32 are folded. In this way, the envelope-like folding is completed during the transport of the inner pack 13 on the conveyor 85 and the inner pack 13 is then introduced by the pusher 87 into pockets 91 of an adjacent sealing turret 92. After transfer of the partially folded inner pack 13, the latter is located in a configuration according to FIG. 4 on the cyclically driven sealing turret 92.

Figure 15:
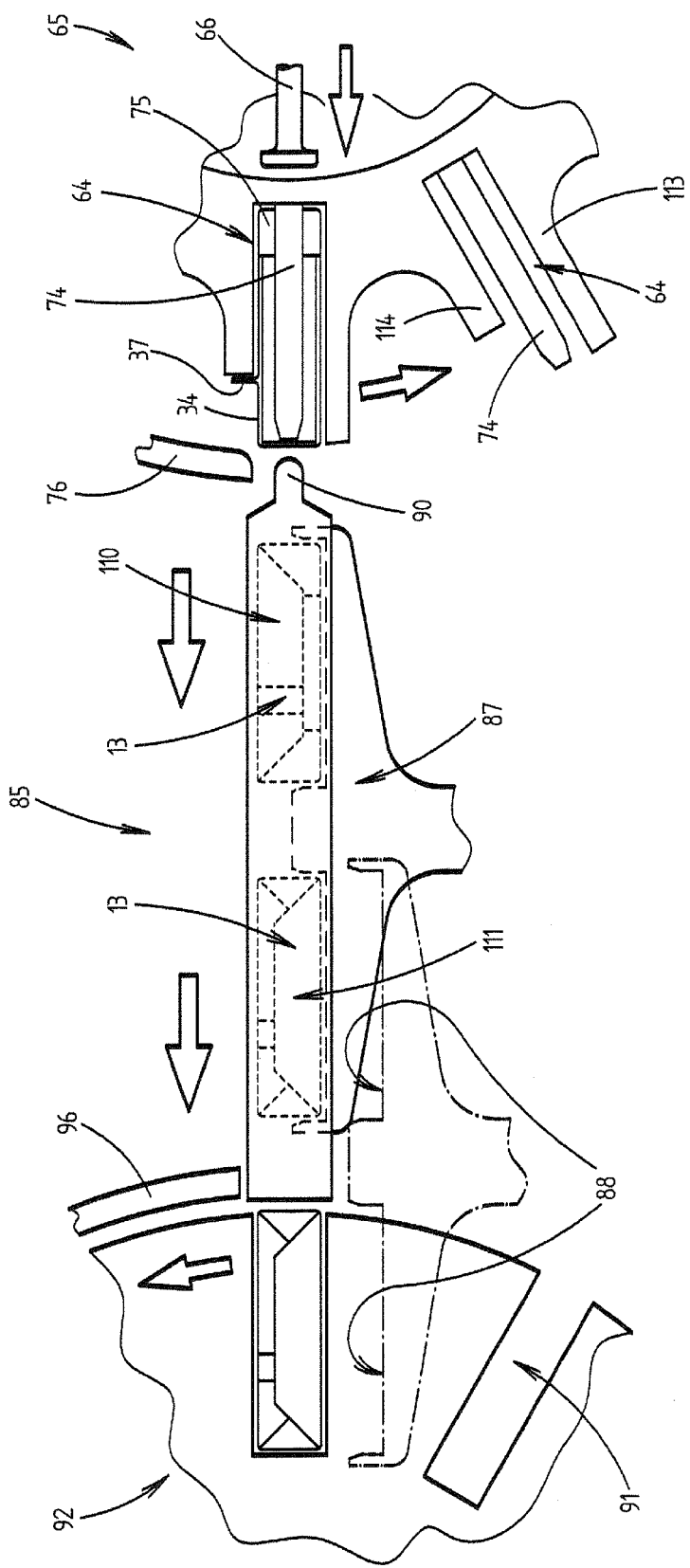
FIG. 15 shows a detail of the apparatus according to FIG. 8 in the region XV in an enlarged side view.

The pockets 91 of the sealing turret 92 which rotates about a horizontal axis are directed radially and serve to receive in each case one inner pack 13. In a push-in station of the sealing turret 92 according to FIG. 15, a pocket 91 for receiving the inner pack 13 is oriented so as to be flush with the conveyor 85 as an extension of the latter. After the sealing of the inner pack 13 in the region of the inner side walls 35 during the circulation on the sealing turret 92, the packs are removed in a push-out station which lies opposite the push-in station. The sealing therefore takes place within a rotation of the sealing turret 92 by 180°.

In the present case, four sealing devices 93 are provided, namely in an 11 o'clock, 12 o'clock, 1 o'clock and 2 o'clock position. The sealing devices 93 consist in each case of two sealing jaws 94 which can be pressed from both sides over the full surface area against the inner side walls 35 of the inner pack 13. During the standstill phase of the sealing turret 92, the sealing of the folding flaps 110, 111 takes place correspondingly in four stations which follow one another. It goes without saying that both a larger and a smaller number of sealing devices 93 can be provided. The sealing devices 93 can also be arranged at other positions.

Figure 16:
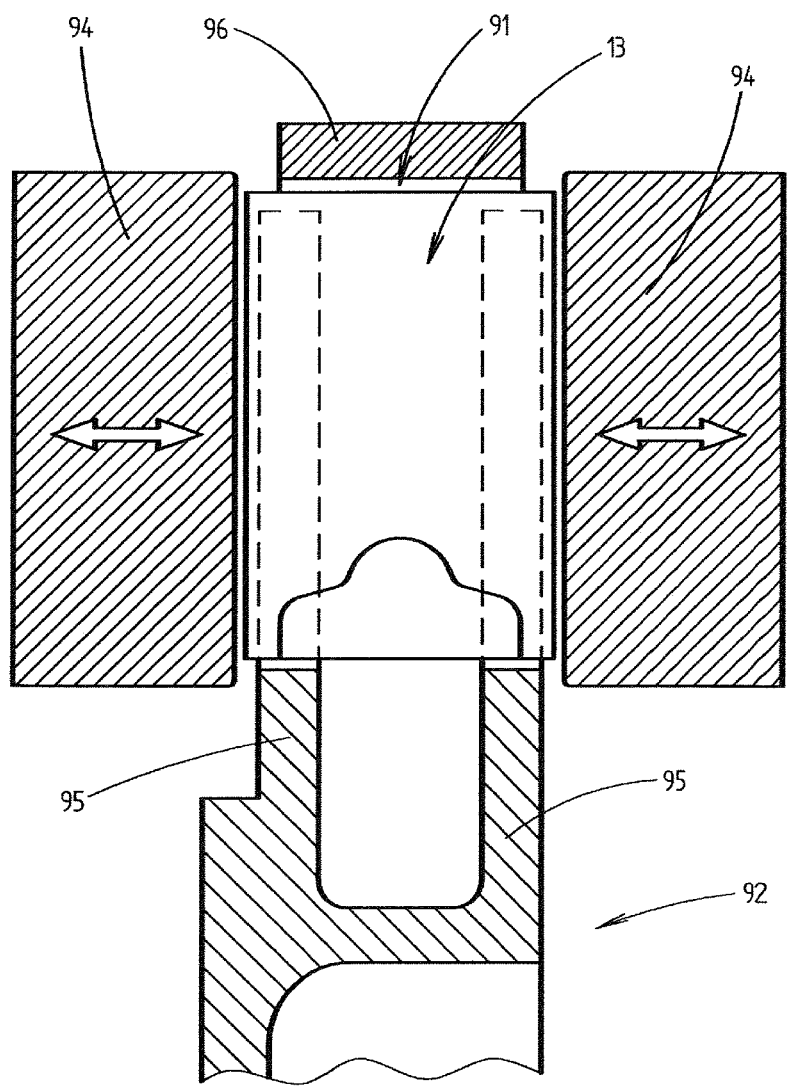
FIG. 16 shows a section through the apparatus on an enlarged scale taken along section line XVI-XVI in FIG. 8.
Figure 17:
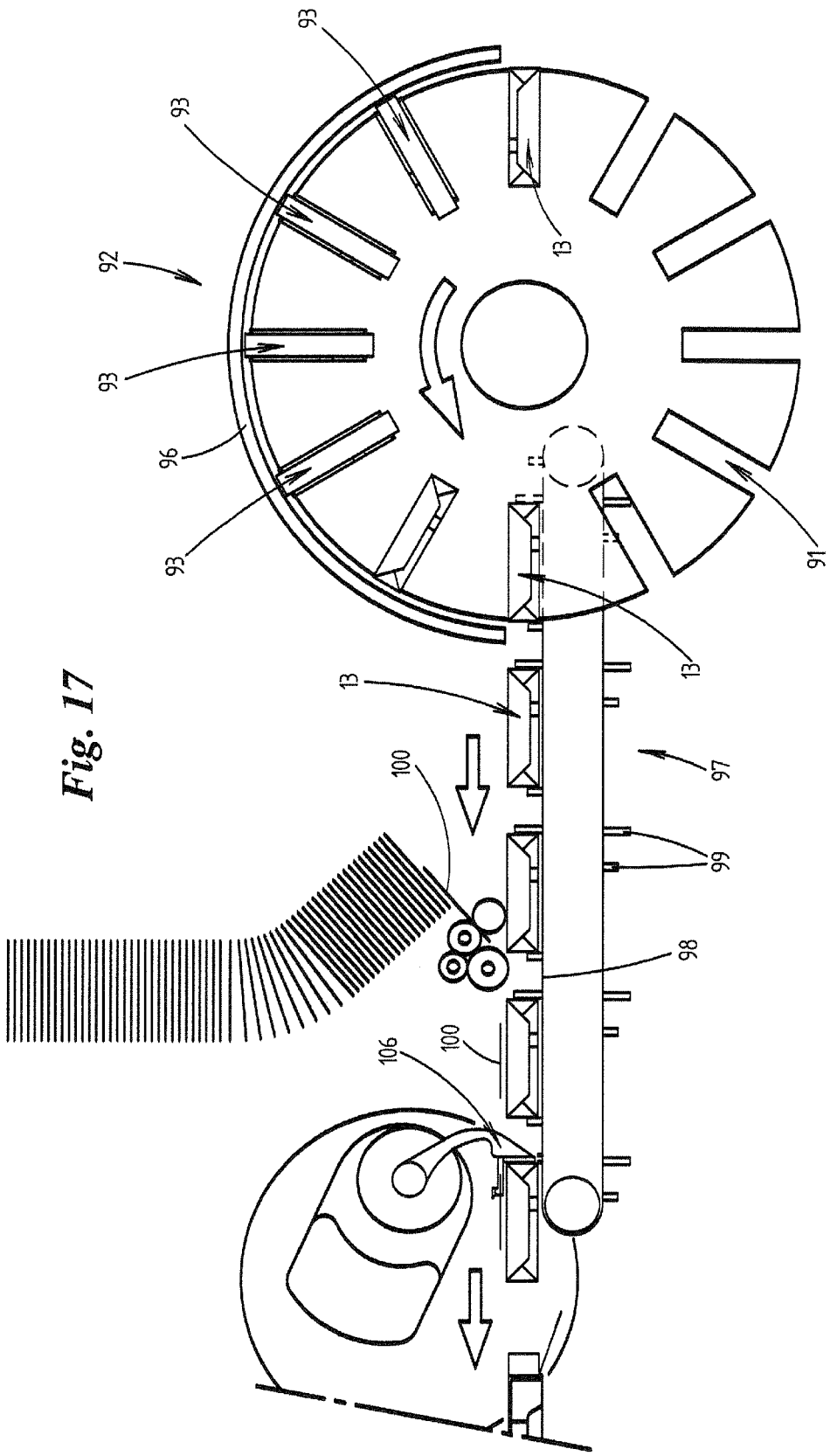
FIG. 17 shows an enlarged side view of part of the apparatus according to region XVII in FIG. 6.

As, in particular, FIG. 16 shows, the sealing turret 92 has two turret disks 95 which are arranged in parallel planes and at a spacing from one another. Recesses for forming the radial pockets 91 are arranged in the turret disks 95. In order to push the inner packs 13 into the pockets 91, the pusher 87 engages between the two turret disks 95. Furthermore, an outer guide 96 is provided along the transport path of the inner packs 13 on the circumference of the sealing turret 92. For sealing, the sealing jaws 94 are moved in the horizontal direction against the inner side walls 35 and, after the sealing, are removed again for the further transport of the sealing turret 92 by one position.

The completely sealed inner packs 13 are pushed out in the push-out station which has already been mentioned. There, the packs are gripped by a horizontal conveyor 97 which, like the pusher 87, engages between the turret plates 95, in order to remove a pack out of a pocket 91. On the discharge conveyor 97, the inner packs 13 lie with the inner rear wall 34 pointing downward on a conveying run 98 between drivers 99 of the latter.

In the region of the conveyor 97, coupons 100 or other printing carriers can be positioned on the inner front walls 32 of the sealed blocks 25. For this purpose, suitable coupon feeders and magazines for supplying the coupons 100 are known from the prior art.

Also provided is a unit for separating, feeding and placing collars 16 in position in relation to the sealed blocks 25. FIG. 5 shows, in this respect, the operation of feeding a continuous material web 101 and also a following cutting device 102 with blade roller 103 and mating roller 104 for severing the collars 16 from the material web 101. The separated collars 16 are subsequently spaced apart from one another and then transferred onto a transverse conveyor 105, which transports the collars 16 in the direction of the conveyor 97 until they are located above the sealed blocks 25. There, they are positioned on the sealed blocks 25 by a collar inserter 106. The apparatus may be designed, in this region, in accordance with the Applicant's EP 0 496 261 B1 or EP 0 667 232 B1.

Following the operation of feeding the collars 16, the sealed blocks 25 are transferred onto a folding turret 107, in which are supplied pre-folded blanks for the outer pack 12. The pack 10 is then completed in a known manner on the folding turret 107.

Of course, the operation of feeding coupons 100 and collars 16 is optional and need not necessarily be included.

LIST OF DESIGNATIONS

10 Pack
11 Cigarette group
12 Outer pack
13 Inner pack
14 Box part
15 Lid
16 Collar
17 Box front wall
18 Base wall
19 Box rear wall
20 Lid rear wall
21 End wall
22 Lid front wall
23 Box side wall
24 Lid side wall
25 Sealed block
26 Inner blank
27 Opening tab
28 Weakening line
29 Actuating tab
30 Punched line
31 Closure strip
32 Inner front wall
33 Inner end wall
34 Inner rear wall
35 Inner side wall
36 Inner base wall
37 Fin seam
38 Inner collar
39 Collar front wall
40 Collar side wall
42 Cutout
43 Extension
44 Folding line
45 Grip tongue
46 Cigarette magazine
47 Push-rod assembly
48 Pocket
49 Turret
50 Cigarette diverter
51 Pusher
52 Turret
53 Pocket
54 Material web
55 Cutting device
56 Blade roller
57 Mating roller
58 Conveying-roller pair
59 Ram
60 Transverse conveyor
61 Forming pocket
62 Pusher
63 Pusher
64 Pocket
65 Folding turret
66 Pusher
67 Material web
68 Deflecting roller
69 Pendulum-type store
70 Suction conveyor
71 Conveying strand
73 Pusher plate
74 Folding finger
75 Corner flaps
76 Outer guide
77 Sealing bar
78 Sealing station
79 Sealing jaw
80 Cutout
81 Pusher plate
82 Pusher nose
83 Suction channel
85 Conveyor
86 Guide
87 Pusher
88 Depression
89 Corner flaps
90 Folding finger
91 Pocket
92 Sealing turret
93 Sealing device
94 Sealing jaw
95 Turret disk
96 Outer guide
97 Discharge conveyor
98 Conveying run
99 Driver
100 Cutting device
101 Blade roller
102 Mating roller
103 Transverse conveyor
104 Collar inserter
105 Folding turret
106 Collar inserter
107 Folding turret
108 Folding flaps
109 Folding flaps
110 Folding flaps
111 Folding flaps
112 Corresponding guide
113 Pocket wall
114 Pocket wall
A Spacing

What is claimed is:

1. A method of producing packs (10) for cigarettes, the packs (10) having an outer pack (12) configured as a hinge-lid box, and an inner pack (13) as a sealed block (25) with an inner blank (26) which encloses the pack contents, and is made of aroma-tight and moisture-tight, thermally sealable sheet material, the inner pack having, in the region of an inner end wall (33), an opening aid which is usable a number of times and, in the region of side walls of the inner pack (13), folding flaps which are connected to one another by thermal sealing, the method comprising:

a) conveying the pack contents, by the inner blank (26), into the pocket (64) of a folding turret (65), with the pack contents being wrapped partially in the inner blank (26);

b) connecting folding flaps (108, 109) in the region of an inner rear wall (34) of the inner blank (26) to one another by thermal sealing to form a fin seam (37) in the folding turret (65), in a plurality of successive sealing stations (78), which are arranged on the circumference of the folding turret (65), while the cyclically driven folding turret (65) is at a standstill;

c) folding end regions of the fin seam (37) over into the plane of inner side walls (35) in such a way that they are arranged at a spacing (A) from regions of folding flaps which cover one another multiple times, in the region of the inner side walls (35);

d) during feeding of the pack contents into a pocket (64) of the folding turret (65), placing a folding flap (108) of the inner blank (26) for the fin seam (37) against a sealing bar (77) which is assigned to the pocket (64) by way of a pusher nose (82) which is formed on a pusher (63) for the pack contents, and is held there by vacuum by at least one suction channel (83), wherein the sealing bar is arranged laterally next to the pocket (64) and at a spacing from the circumference of the folding turret (65);

e) guiding a further folding flap (109) for the fin seam from the circumference of the folding turret (65) through a sealing jaw (79) of a sealing station (78) to the sealing bar (77); and f) sealing the further folding flap with the first folding flap (108) by the application of pressure and heat to the fin seam (37).

2. The method as claimed in claim 1, further comprising, after sealing of the fin seam (37) in the region of the inner rear wall (34) and the folding over of the fin seam (37) against the inner rear wall (34), folding flaps (110, 111) of the inner blank (26) into the region of the inner side walls (35) with covering of corner flaps (75, 89) of the inner blank (26) and are sealed to one another, wherein, first of all, folding the corner flaps (75, 89) into the plane of the inner side walls (35) and, afterward, folding flaps (110) of the inner rear wall (34) with end regions of the fin seam (37) and, furthermore, folding flaps (111) of the inner front wall (32), and wherein the inner side walls (35) are sealed completely afterward.

3. The method as claimed in claim 1, wherein:
the fin seam (37) is formed in the region of the folding turret (65);
in the region of a horizontally directed conveyor (85) which adjoins the folding turret (65), the envelope-like folding of the folding flaps (110, 111) takes place in the region of the inner side walls (35); and
on a sealing turret (92) which adjoins the conveyor (85), the sealed block (25) is completed by sealing of the folding flaps (110, 111) and the corner flaps (75, 89) which overlap one another, in the region of the inner side walls (35).

4. The method as claimed in claim 1, further comprising feeding the pack contents, prior to the inner blank (26) being fed, an inner collar (38), which is positioned in a U-shaped manner in a turret (52) and into which the cigarette group (11), as pack contents, is then pushed, and conveying the pack contents with the inner collar (38) out of the turret (52) and into the folding turret (65) by the inner blank (26), in such a way that the inner blank (26) is fed to the folding turret (65) from above, the inner collar (38) being fed to the turret (52) from the side, in each case as a continuous material web (54, 67), which is then cut up into individual blanks.

5. The method as claimed in claim 4, further comprising, while the pack contents are conveyed with the inner collar (38) into the pocket (64) of the folding turret (65), placing the inner blank (26) against the pack contents and/or the inner collar (38), by way of an outer guide (76) which is arranged on the circumference of the folding turret (65) in conjunction with a corresponding guide (112), which together form an orifice for the pack contents with the inner collar (38).

6. The method as claimed in claim 5, further comprising, during the production of the packs, changing the height of the orifice, firstly reduced in order to feed the pack contents with the inner blank (26) to the pocket (64) and secondly enlarged, in order that the pusher (63) can be moved through between the corresponding guide (112) and the upper guide (76).

7. An apparatus for producing packs (10) for cigarettes, the packs (10) having an outer pack (12) configured as a hinge-lid box, and an inner pack (13) as a sealed block (25) with an inner blank (26) which encloses the pack contents, and is made of aroma-tight and moisture-tight, thermally sealable sheet material, the inner pack having, in the region of an inner end wall (33), an opening aid which is usable a number of times and, in the region of inner side walls (35), folding flaps which are connected to one another by thermal sealing, the apparatus comprising:

a folding turret (65) with pockets (64) for receiving pack contents in each case with the inner blank (26) positioned around the same; and a plurality of sealing stations (78), which are arranged on the circumference of the folding turret (65) and are for sealing folding flaps in the region of an inner rear wall (34) for the inner blank (26) in the manner of a fin seam (37) while the cyclically driven folding turret (65) is at a standstill, and with at least one folding means for folding the fin seam (37) against the inner rear wall (34) and the inner side walls (35), in such a way that end regions of the fin seam (37) are arranged at a spacing (A) from regions of folding flaps which cover one another multiple times, in the region of the inner side walls (35), and during feeding of the pack contents into a pocket (64) of the folding turret (65), placing a folding flap (108) of the inner blank (26) for the fin seam (37) against a sealing bar (77) which is assigned to the pocket (64) by way of a pusher nose (82) which is formed on a pusher (63) for the pack contents, and is held there by vacuum by at least one suction channel (83), wherein the sealing bar is arranged laterally next to the pocket (64) and at a spacing from the circumference of the folding turret (65), and guiding a further folding flap (109) for the fin seam by the circumference of the folding turret (65) through a sealing jaw (79) of the sealing station (78) to the sealing bar (77) and is sealed with the folding flap (108) by the application of pressure and heat to the fin seam (37).

8. An apparatus for producing packs (10) for cigarettes, the packs (10) having an outer pack (12) configured as a hinge-lid box, and an inner pack (13) as a sealed block (25) with an inner blank (26) which encloses the pack contents, and is made of aroma-tight and moisture-tight, thermally sealable sheet material, the inner pack having, in the region of an inner end wall (33), an opening aid which is usable a number of times and, in the region of inner side walls (35), folding flaps which are connected to one another by thermal sealing, the apparatus comprising:

a folding turret, wherein a set of pack contents with the inner blank (26) laid around it is pushed along a horizontal conveying path into a pocket (64) of the folding turret (65);

a plurality of sealing stations (78), which are arranged on the circumference of the folding turret (65), and are provided for sealing folding flaps of the inner blank (26) in the region of an inner rear wall (34) of the inner blank (26) in the manner of a fin seam (37), and wherein the inner pack (13) which is sealed partially to this extent is transported along a horizontal conveying path (85) which adjoins the folding turret (65) and in the region of which lateral folding flaps is folded in the manner of an envelope in the region of the inner side walls (35); and an adjacent sealing turret (92), wherein the inner pack (13) which is completely folded and is sealed partially to this extent is introduced into a pocket (91) of the adjacent sealing turret (92), and wherein sealing devices (93) are arranged on the circumference of the sealing turret (92), for sealing the folding flaps over the full surface area in the region of the inner side walls (35), and during feeding of the pack contents into a pocket (64) of the folding turret (65), placing a folding flap (108) of the inner blank (26) for the fin seam (37) against a sealing bar (77) which is assigned to the pocket (64) by way of a pusher nose (82) which is formed on a pusher (63) for the pack contents, and is held there by vacuum by at least one suction channel (83), wherein the sealing bar is arranged laterally next to the pocket (64) and at a spacing from the circumference of the folding turret (65), and guiding a further folding flap (109) for the fin seam by the circumference of the folding turret (65) through a sealing jaw (79) of the sealing station (78) to the sealing bar (77) and is sealed with the folding flap (108) by the application of pressure and heat to the fin seam (37).

9. The apparatus as claimed in claim 7 or 8, wherein the folding turret (65) is followed by a conveyor (85) for the pack contents with the inner blank (26), this conveyor having fixed-location folding diverters for folding the folding flaps in the region of the inner side walls (35), and wherein, arranged further along the conveying route of the pack contents with the inner blank (26) in the region of the sealing turret (92), are a plurality of the sealing devices (93), for sealing the inner side walls (35), with multiple-overlap folding flaps over the entire surface area.

10. The apparatus as claimed in claim 7 or 8, wherein, the or each sealing station (78) has the sealing bar (77), which is assigned to the pockets (64) of the folding turret (65), and the sealing jaw (79), which is arranged at a fixed location on the circumference of the folding turret (65), wherein the sealing jaw (79) is spaced apart from the sealing bar (77) during the rotary phase of the folding turret (65) and is brought into abutment against the sealing bar (77) for the purpose of sealing the fin seam (37), this displacement of the sealing jaw being achieved by movement in a radial direction in relation to the circumference of the folding turret (65), and wherein the sealing bar (77) is arranged at a spacing from the circumference of the folding turret (65) laterally next to it, and wherein suction channels (83) open into the sealing bar (77) for holding the folding flap (108) for the fin seam (37) in a sealing position.

11. The apparatus as claimed in claim 7 or 8, wherein a turret (52) is arranged upstream of the folding turret (65), which turret (52) has pockets (53) for successively receiving a collar (16) and a cigarette group (11) in order to combine them, wherein the collars (16) are fed laterally to the turret (52) by way of a transverse conveyor (60) and are transferred from the transverse conveyor (60) into a forming pocket (61) by means of a ram (59) and are fed by the forming pocket (61) to the pocket (53).

12. The apparatus as claimed in claim 7 or 8, wherein rotational axes of the folding turret (65) and the sealing turret (92) and of the conveyors (65) are arranged in one plane, and wherein a push-out station of the conveyor (52) is likewise arranged in this plane, and wherein the rotational axes of the folding turret (65) and the sealing turret (92) are directed transversely with respect to the transport direction of the inner packs (13), whereas a rotational axis of the conveyor (52) points parallel to the transport direction.

\* \* \* \* \*